Oct. 31, 1967  E. A. NOWAK  3,350,189
PASTE MOLD MACHINES FOR MAKING GLASS ARTICLES
Filed Nov. 5, 1964  3 Sheets-Sheet 1

INVENTOR.
EDWARD A. NOWAK

BY
ATTORNEYS

Oct. 31, 1967   E. A. NOWAK   3,350,189
PASTE MOLD MACHINES FOR MAKING GLASS ARTICLES
Filed Nov. 5, 1964   3 Sheets-Sheet 2

INVENTOR.
EDWARD A. NOWAK
BY
ATTORNEYS

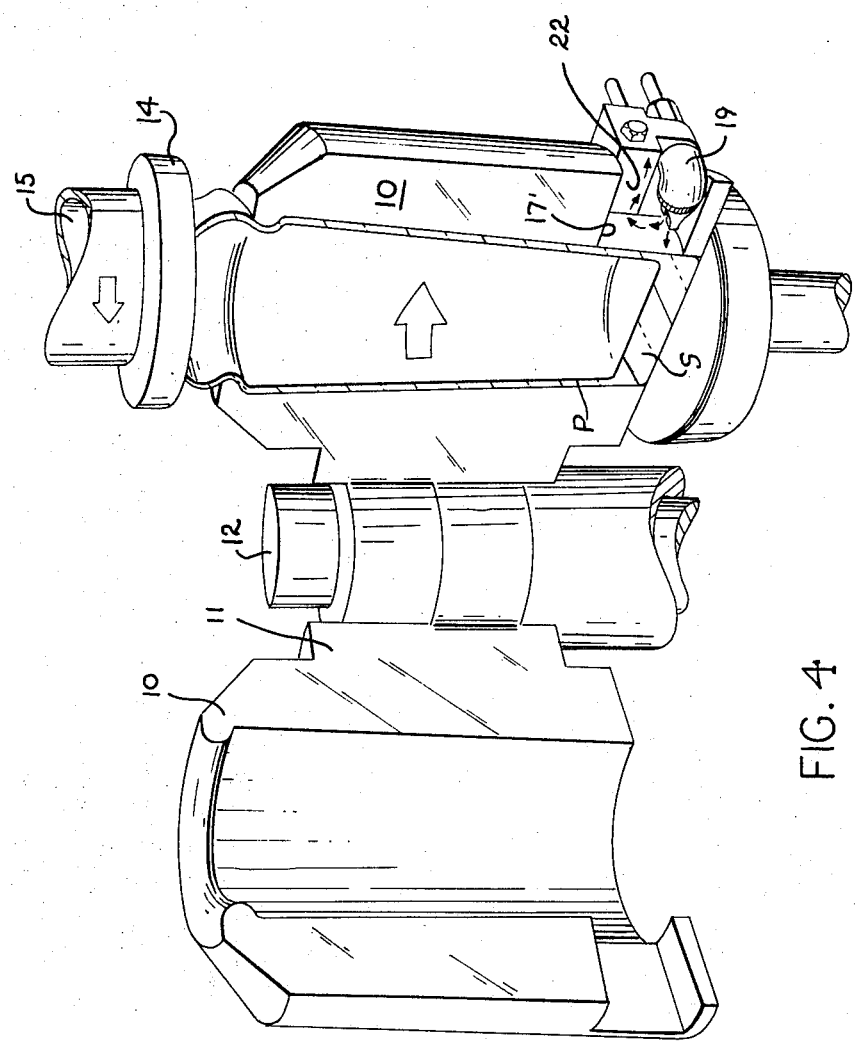

United States Patent Office 3,350,189
Patented Oct. 31, 1967

3,350,189
PASTE MOLD MACHINES FOR MAKING
GLASS ARTICLES
Edward A. Nowak, Toledo, Ohio, assignor to Owens-
Illinois, Inc., a corporation of Ohio
Filed Nov. 5, 1964, Ser. No. 409,066
5 Claims. (Cl. 65—302)

ABSTRACT OF THE DISCLOSURE

The apparatus for making glass articles disclosed herein comprises a paste mold and a neck ring for rotatably supporting a hollow glass parison within the paste mold. Air may be introduced through the neck ring to blow the parison outwardly adjacent the walls of the paste mold. A nozzle extends into an opening through a wall of the paste mold adjacent a portion at which the glass article retains a high heat concentration when molded therein and directs a liquid and gas coolant under pressure onto the shaped glass article while the article is rotating.

---

This invention relates to making glass articles and particularly to making glass articles on paste mold machines.

In the manufacture of glass articles on paste mold machines, it is conventional to support a hollow glass parison on a neck ring and rotate the parison within a paste mold by the neck ring while applying air to the interior of the parison to blow the parison outwardly adjacent the moistened walls of the paste mold and shape the glass article. The walls of the paste mold are moistened so that a steam cushion is provided between the glass and the paste mold.

In such paste mold machines, it is necessary to retain the shaped glass article within the paste mold for a sufficient length of time to permit the glass article to cool and thereby retain its shape. For example, when glass articles having heavy sections, such as tumblers with sham bottoms, are made, the rate at which the articles can be made in a paste mold is substantially reduced. In addition, the high concentration of heat tends to dry out the walls of the paste mold resulting in contact of the glass with the paste mold so that undesirable lines are formed on the glass surface.

It is an object of this invention to provide a method and apparatus for making glass articles on paste mold machines wherein glass articles may be made at a greater rate in the paste mold.

It is a further object of the invention to provide such a method and apparatus wherein more physically stable glass articles can be produced.

Basically, the invention comprises applying a coolant through an opening in the paste mold directly against a circumferentially isolated portion of the surface of a glass article after it has been shaped and while it is still being rotated. This produces a preferential cooling of a circumferential portion of the glass article permitting the mold to be opened sooner and resulting in a higher mold cavity rate and more physically stable glass article.

In the drawings:

FIG. 4 is a fragmentary perspective view similar to FIG. 1 of a modified form of the invention.

Figure 1:
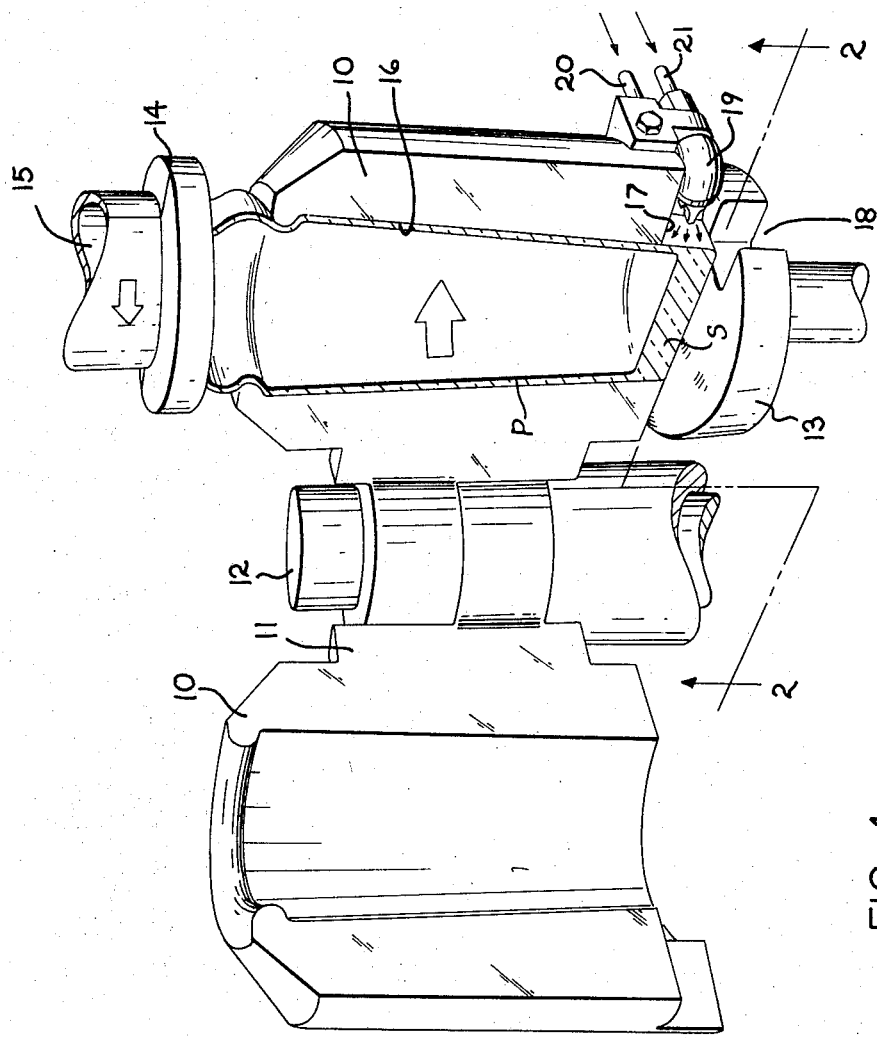
FIG. 1 is a fragmentary perspective view of a paste mold machine embodying the invention.

Referring to the drawings, the paste mold machine embodying the invention is of well-known construction, such as shown in the patent to Kadow 1,527,556, and comprises a partible paste mold 10, the halves of which are supported by arms 11 for swinging movement about a vertical post 12. A bottom plate 13 is movable upwardly against the mold to close the mold cavity. A neck ring 14 supports a hollow parison P and rotates the parison within the paste mold 10. Air is supplied through passage 15 to the interior of the parison to blow the hot glass parison outwardly against the steam cushion produced at the walls of the cavity 15 of the paste mold. The paste mold is of conventional construction and incorporates a porous inner surface such as burnt cork dust and binder which is moistened during the glass forming cycle, as is well known in the art.

In accordance with the invention, at circumferentially spaced points in the halves of the paste mold 10, one or more openings 17 are provided which extend radially inwardly and expose portions of the surface of the glass article which is formed. One or more exhaust openings 18 are provided in the bottom plate 13 adjacent openings 17. A nozzle 19 is positioned in each said opening 17 and is adapted to spray a coolant radially inwardly against the surface of the glass article. Nozzle 19 includes a liquid inlet 20 and a gas inlet 21.

In accordance with the invention, the parison P is rotated within the mold 10 and air is supplied through opening 15 to blow the parison outwardly to the approximate shape of the cavity 16 and thereby form the glass into the final article form. After the glass article has been shaped, coolant is applied against a circumferentially isolated portion of the surface of the rotating glass article by actuation of a valve. At the same time, the blowing air is maintained within the parison. The pressure of coolant is less than the pressure of the blowing air in order to prevent any distortion.

The quantity and rate of application of coolant is such as to cool the surface without crizzling of the glass. The application of coolant is then discontinued, the molds are opened and the glass article is removed from the mold.

It has been found that by applying the coolant to a circumferentially isolated portion of the surface of the glass article after the glass article has been formed and while it is still being rotated, the circumferential surface of the glass article is rapidly cooled sufficiently to permit the glass article to be removed from the mold. In addition, when the coolant is a liquid, it tends to replenish the water that normally moistens the walls of the paste mold and tends to be removed by the high heat concentration. Thus, the liquid coolant tends to supplement the liquid in the moistened walls of the paste mold in the areas of high heat concentration.

As a result, the rate at which glass articles can be made in the mold is increased and more physically stable and better appearing glass articles are produced. For example, where a tumbler having a sham bottom S (FIG. 1) is being produced, the application of coolant to the surface of the article while it is rotating within the closed mold facilities removal of a large quantity of heat in the heavy glass portions which normally reheat rapidly, so that the article can be removed from the mold more quickly without subsequent distortion as would occur if the article were removed before it has been cooled sufficiently.

Where the section of the glass article retains a large amount of heat, as where the sham bottom of a tumbler is very heavy, there may be a tendency for the lowermost corner to be cooled excessively and thereby cause checking. In order to permit a greater quantity of coolant to be applied so that the desired heat removal is achieved without checking of the corner, the apparatus shown in FIG. 4 may be used.

Figure 3:
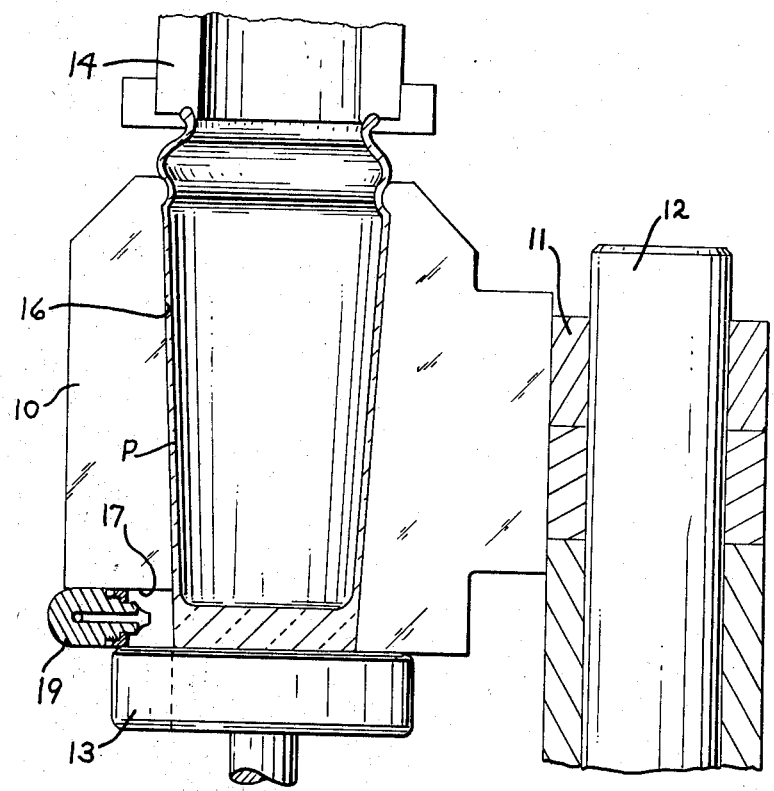
FIG. 3 is a sectional view taken along the line 3—3 in FIG. 2.
Figure 2:
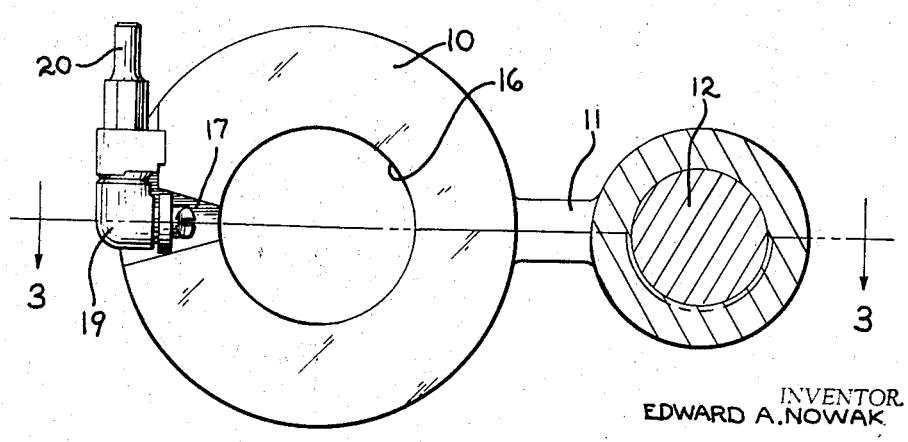
FIG. 2 is a sectional view taken along the line 2—2 in FIG. 1 with the mold halves closed.

As shown in FIG. 4, the nozzle 19 is positioned in an opening 17' which is enlarged upwardly to provide a space 22 through which the coolant is exhausted. The exhaust opening 18 of FIGS. 1–3 is eliminated. The lower surface of opening 17', which is spaced from the lower edge of mold half 10, is inclined downwardly and outwardly to permit any condensed coolant to flow away from the mold. Since in the arrangement shown in FIG. 4 the coolant is exhausted above the nozzle 19, any tendency to cool the lower corner of the glass article excessively is eliminated and at the same time large quantities of coolant can be applied to effectively remove a large amount of heat quickly.

I claim:

1. In an apparatus for making glass articles comprising a paste mold, a neck ring for rotatably supporting a hollow glass parison within the paste mold and through which blowing air is adapted to be introduced to blow the parison outwardly adjacent the walls of the paste mold, the improvement comprising said paste mold having a wall with an opening therethrough adjacent a portion at which the glass article retains a high heat concentration when molded therein, means extending through said opening in said wall of the paste mold at a circumferentially isolated portion of the paste mold for introducing a coolant against the surface of the shaped glass article while the article is rotating, and exhaust means adjacent said last-mentioned means for removing said coolant.

2. In an apparatus for making glass articles comprising a paste mold, a neck ring for rotatably supporting a hollow glass parison within the paste mold and through which blowing air is adapted to be introduced to blow the parison outwardly adjacent the walls of the paste mold, the improvement comprising said paste mold having a wall with an opening therethrough adjacent a portion at which the glass article retains a high heat concentration when molded therein, means extending through said opening in said wall of the paste mold at a plurality of circumferentially and axially isolated portions of the paste mold for introducing a coolant against the surface of the shaped glass article while it is rotating, and exhaust means adjacent said last-mentioned means for removing said coolant.

3. In an apparatus for making glass articles comprising a paste mold, a neck ring for rotatably supporting a hollow glass parison within the paste mold and through which blowing air is adapted to be introduced to blow the parison outwardly adjacent the walls of the paste mold, the improvement comprising said paste mold having a wall with an opening therethrough adjacent a portion at which the glass article retains a high heat concentration when molded therein, means extending through said opening in said wall of the paste mold at a circumferentially isolated portion of the paste mold for introducing a liquid and gas coolant under pressure adjacent the surface of the shaped glass article while the article is rotating, and exhaust means adjacent and above said last-mentioned means for removing said coolant.

4. In an apparatus for making glass articles comprising a paste mold, a neck ring for rotatably supporting a hollow glass parison within the paste mold and through which blowing air is adapted to be introduced to blow the parison outwardly adjacent the walls of the paste mold, the improvement wherein said paste mold having a wall with an opening therethrough spaced from the lower end of said wall, nozzle means extending through said opening in said wall of the paste mold at a circumferentially isolated portion of the paste mold for introducing a liquid and gas coolant under pressure adjacent the surface of the shaped glass article while the article is rotating, said opening in said side wall being enlarged upwardly above said nozzle means to permit said coolant to be exhausted through said wall.

5. In an apparatus for making glass articles comprising a paste mold, a neck ring for rotatably supporting a hollow glass parison within the paste mold and through which blowing air is adapted to be introduced to blow the parison outwardly adjacent the walls of the paste mold, the improvement comprising said paste mold having a wall with an opening therethrough adjacent a portion at which the glass article retains a high heat concentration when molded therein, nozzle means extending through said opening in said wall of the paste mold at a circumferentially isolated portion of the paste mold for introducing a liquid and gas coolant under pressure adjacent the surface of the shaped glass article while the article is rotating, and exhaust means adjacent said last-mentioned means for removing said coolant.

References Cited

UNITED STATES PATENTS

| | | | |
|---|---|---|---|
| 443,403 | 12/1890 | Neville | 65—356 |
| 3,186,818 | 6/1965 | Havens et al. | 65—169 |
| 3,203,777 | 8/1965 | Berry et al. | 65—24 |

HOWARD R. CAINE, *Acting Primary Examiner.*

DONALL H. SYLVESTER, *Examiner.*

R. L. LINDSAY, *Assistant Examiner.*